(12) United States Patent
Matsushita et al.

(10) Patent No.: US 12,534,114 B2
(45) Date of Patent: Jan. 27, 2026

(54) ELECTRIC-POWERED VEHICLE

(71) Applicant: MITSUBISHI HEAVY INDUSTRIES, LTD., Tokyo (JP)

(72) Inventors: Takatoshi Matsushita, Tokyo (JP); Masaya Mitake, Tokyo (JP); Hitoshi Onuma, Tokyo (JP); Hiroyuki Yagita, Tokyo (JP); Kentaro Hayashi, Tokyo (JP); Katsuhiko Shoda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 757 days.

(21) Appl. No.: 17/792,172

(22) PCT Filed: Jan. 7, 2021

(86) PCT No.: PCT/JP2021/000325
§ 371 (c)(1),
(2) Date: Jul. 12, 2022

(87) PCT Pub. No.: WO2021/145264
PCT Pub. Date: Jul. 22, 2021

(65) Prior Publication Data
US 2023/0047288 A1 Feb. 16, 2023

(30) Foreign Application Priority Data
Jan. 17, 2020 (JP) ................ 2020-005600

(51) Int. Cl.
*B61C 9/48* (2006.01)
*H02K 7/14* (2006.01)

(52) U.S. Cl.
CPC ...... *B61C 9/48* (2013.01); *H02K 7/14* (2013.01)

(58) Field of Classification Search
CPC .................................. B61C 9/48; H02K 7/14
See application file for complete search history.

(56) References Cited

U.S. PATENT DOCUMENTS 4,270,622 A * 6/1981 Travis ............... B60L 3/0061
475/5
5,893,425 A * 4/1999 Finkle ............... A63C 17/015
180/181

(Continued)

FOREIGN PATENT DOCUMENTS

CN 104709293 A * 6/2015 ............... B61C 9/44
CN 105813916 A * 7/2016 ............. B61C 17/00

(Continued)

OTHER PUBLICATIONS

Chinese Office Action and Search Report for Chinese Application No. 202180008674.4, dated Jun. 14, 2024, with an English translation.

(Continued)

*Primary Examiner* — Jason C Smith
(74) *Attorney, Agent, or Firm* — Birch, Stewart, Kolasch & Birch, LLP

(57) ABSTRACT

An electric-powered vehicle includes: an axle body that includes an axle and drive wheels connected to both ends of the axle; a magnetic geared motor for rotating the axle, the magnetic geared motor including a stator, a low-speed rotor, and a high-speed rotor; a vehicle structure supported by the axle body; a motor support for connecting the vehicle structure and the stator, and supporting the magnetic geared motor by the vehicle structure; and an elastic coupling for coupling the low-speed rotor and the axle such that a rotational force of the low-speed rotor is transmittable to the axle.

7 Claims, 3 Drawing Sheets

(56) References Cited

U.S. PATENT DOCUMENTS

| | | | |
|---|---|---|---|
| 6,868,793 B2 | 3/2005 | Hoffman et al. | |
| 7,812,486 B2 | 10/2010 | Pfannschmidt | |
| 7,982,351 B2* | 7/2011 | Atallah | H02K 7/11 |
| | | | 310/181 |
| 8,113,307 B2* | 2/2012 | Holland | B60W 10/08 |
| | | | 180/65.6 |
| 8,167,061 B2* | 5/2012 | Scheuerman | B60L 50/60 |
| | | | 180/65.51 |
| 9,079,482 B2* | 7/2015 | Besler | B60K 17/046 |
| 9,132,735 B2* | 9/2015 | Black | B60L 8/00 |
| 9,170,081 B2* | 10/2015 | Rudinec | B60L 7/14 |
| 9,302,723 B1* | 4/2016 | Pollitzer | B60T 13/741 |
| 9,425,655 B2 | 8/2016 | Calverley et al. | |
| 2010/0241298 A1* | 9/2010 | Sinke | B60W 10/08 |
| | | | 180/65.21 |
| 2010/0283345 A1* | 11/2010 | Atallah | H02K 7/11 |
| | | | 310/114 |
| 2011/0012458 A1* | 1/2011 | Atallah | H02K 51/00 |
| | | | 310/103 |
| 2012/0194021 A1 | 8/2012 | Nakatsugawa et al. | |
| 2012/0217074 A1* | 8/2012 | Rudinec | B60L 53/80 |
| | | | 180/65.1 |
| 2015/0037180 A1* | 2/2015 | Abbott | H02K 51/00 |
| | | | 310/198 |
| 2016/0325762 A1* | 11/2016 | Koerner | B61C 9/50 |
| 2017/0233925 A1* | 8/2017 | Fukui | H02K 21/22 |
| | | | 68/140 |
| 2018/0278190 A1* | 9/2018 | Cerboneschi | H02P 23/0077 |
| 2020/0283086 A1* | 9/2020 | Ulmen | B62M 6/65 |
| 2021/0094517 A1* | 4/2021 | Beik | B60S 9/08 |
| 2023/0047288 A1* | 2/2023 | Matsushita | B61C 9/48 |

FOREIGN PATENT DOCUMENTS

| | | | | |
|---|---|---|---|---|
| EP | 3798070 B1 | * | 3/2022 | B60S 9/04 |
| GB | 2437568 A | * | 10/2007 | H02K 11/048 |
| GB | 2472020 A | * | 1/2011 | B65G 23/08 |
| JP | 2004297868 A | * | 10/2004 | |
| JP | 5204094 B2 | * | 6/2013 | H02K 11/048 |
| JP | 5288373 B2 | | 9/2013 | |
| KR | 102398447 B1 | * | 5/2022 | |
| WO | WO-9845133 A1 | * | 10/1998 | B60K 1/00 |

OTHER PUBLICATIONS

International Preliminary Report on Patentability and English translation of the Written Opinion of the International Searching Authority dated Jul. 28, 2022 for Application No. PCT/JP2021/000325.
International Search Report dated Mar. 30, 2021 for Application No. PCT/JP2021/000325 with an English translation.

* cited by examiner

ELECTRIC-POWERED VEHICLE

TECHNICAL FIELD

The present disclosure relates to an electric-powered vehicle.

The present application claims priority on Japanese Patent Application No. 2020-005600 filed on Jan. 17, 2020, the entire content of which is incorporated herein by reference.

BACKGROUND

A railway vehicle is required of a reduction in weight of the vehicle for high efficiency, high speed, and maintenance saving, as well as securing an interior space and equipment loading space, or space saving of a drive device for lowering a floor. So far, the miniaturization and the weight reduction have been promoted by replacing an induction motor with a permanent magnet motor or replacing an IG-BT inverter with a SiC inverter. For example, in Patent Document 1, a motor for driving an axle is mounted by installing its housing on the axle and being connected to a chassis beam via an elastic control arm.

Meanwhile, a flux-modulated type (harmonic type) magnetic gear is known as a kind of gear device. The magnetic gear includes is an inner circumferential side magnet field and an outer circumferential side magnet field concentrically (coaxially) disposed, and a magnetic pole piece device which has a plurality of magnetic pole pieces (pole pieces) and a plurality of non-magnetic bodies each being disposed with a gap (air gap) between these two magnet fields and alternately arranged in the circumferential direction (see Patent Documents 2 and 3). Then, a magnetic flux of magnets of the above-described two magnet fields is modulated by each of the above-described magnetic pole pieces to generate a harmonic magnetic flux, and the above-described two magnet fields are synchronized with the harmonic magnetic flux, thereby operating the flux-modulated type magnetic gear. For example, in a magnetic geared motor in which the flux-modulated type magnetic gear and a motor are integrated, the above-described outer circumferential side magnet field is fixed to function as a stator, as well as the above-described inner circumferential side magnet field is functioned as a high-speed rotor and the above-described magnetic pole piece device is functioned as a low-speed rotor. Then, by rotating the high-speed rotor by a magnetomotive force of a coil, the ow-speed rotor rotates according to the reduction ratio.

CITATION LIST

Patent Literature

Patent Document 1: U.S. Pat. No. 6,868,793B
Patent Document 2: U.S. Pat. No. 9,425,655B
Patent Document 3: JP5286373B

SUMMARY

Technical Problem

For example, a railway vehicle travels on a rail, but if a large load is applied to the rail, damage to the rail, such as wear, is likely to occur accordingly. Generally, in the railway vehicle, an axle body including an axle and wheels is connected to a bogie for supporting a vehicle body via a spring or the like, and in order to prevent the damage to the rail, it is desirable that the weight of the axle body is small. In this respect, a speed reducer becomes unnecessary, for example, by directly driving the axle with a motor as in Patent Document 1, but the weight of the motor tends to increase and there is a problem in terms of a weight reduction of an electric-powered vehicle. Thus, the present inventors have considered adopting, as a drive source for the electric-powered vehicle such as the railway vehicle, a magnetic geared motor which can be smaller and lighter than a motor such as a permanent magnet motor.

However, if the motor is configured to directly be supported by the axle, for example, by installing the motor housing on a bearing as in Patent Document 1, not to mention a load (static load) of the motor when the electric-powered vehicle is stationary, a full load (dynamic load) of the motor associated with traveling of the electric-powered vehicle acts on the axle. Consequently, since the full dynamic load acting on the axle directly acts on the rail for supporting the axle via the wheels (driving wheels), the damage to the rail is likely to occur. In this respect, in the electric-powered vehicle, the axle and the vehicle body side are usually connected via the spring or the like. However, the present inventors have found that it is possible to reduce the dynamic load of the magnetic geared motor acting on the rail (road surface), by suspending and supporting the magnetic geared motor by a vehicle structure such as a bogie of a railway vehicle.

In view of the above, an object of at least one embodiment of the present invention is to provide the electric-powered vehicle capable of reducing the dynamic load of the magnetic geared motor acting on the axle body.

Solution to Problem

An electric-powered vehicle according to at least one embodiment of the present invention includes: an axle body that includes an axle and drive wheels connected to both ends of the axle; a magnetic geared motor for rotating the axle, the magnetic geared motor including a stator, a low-speed rotor, and a high-speed rotor; a vehicle structure supported by the axle body; a motor support for connecting the vehicle structure and the stator, and supporting the magnetic geared motor by the vehicle structure; and an elastic coupling for coupling the low-speed rotor and the axle such that a rotational force of the low-speed rotor is transmittable to the axle.

Advantageous Effects

According to at least one embodiment of the present invention, an electric-powered vehicle is provided which is capable of reducing a dynamic load of a magnetic geared motor acting on an axle body.

DETAILED DESCRIPTION

Figure 1:
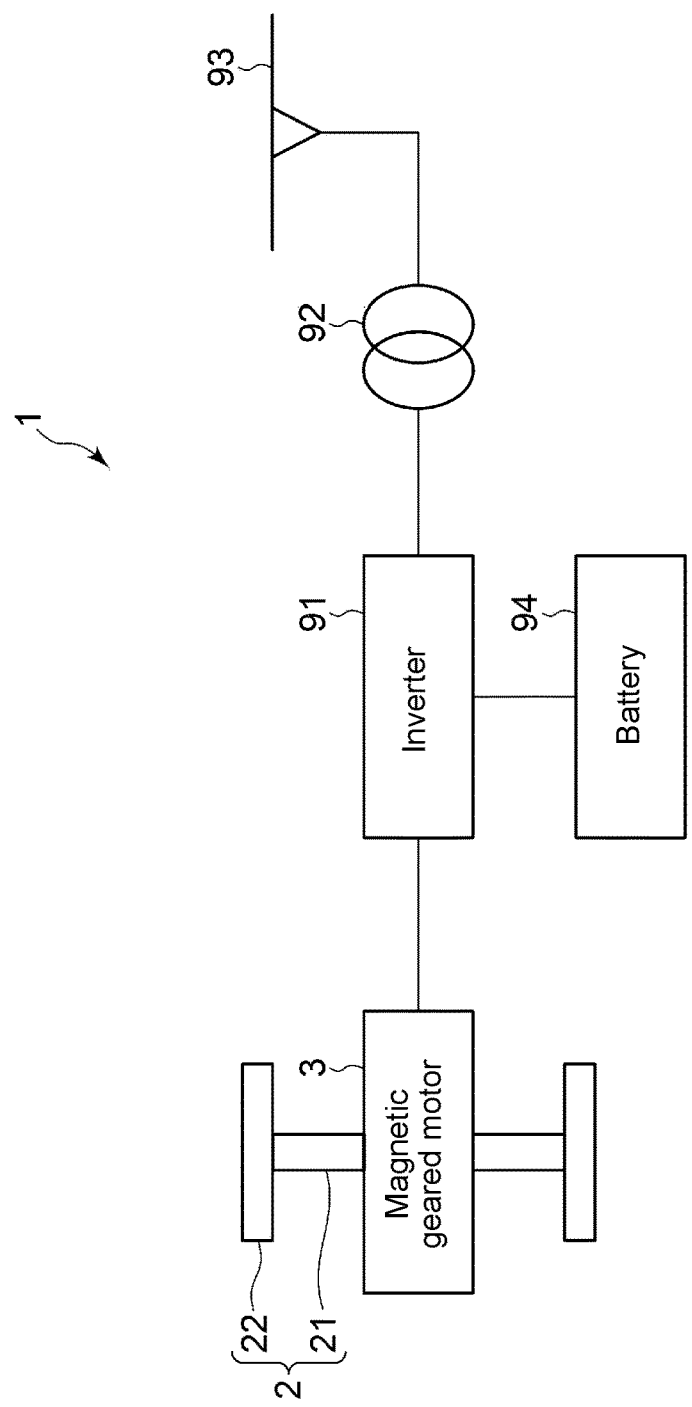
FIG. 1 is a schematic diagram showing a drive device for an electric-powered vehicle according to an embodiment of the present invention.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

Figure 2:
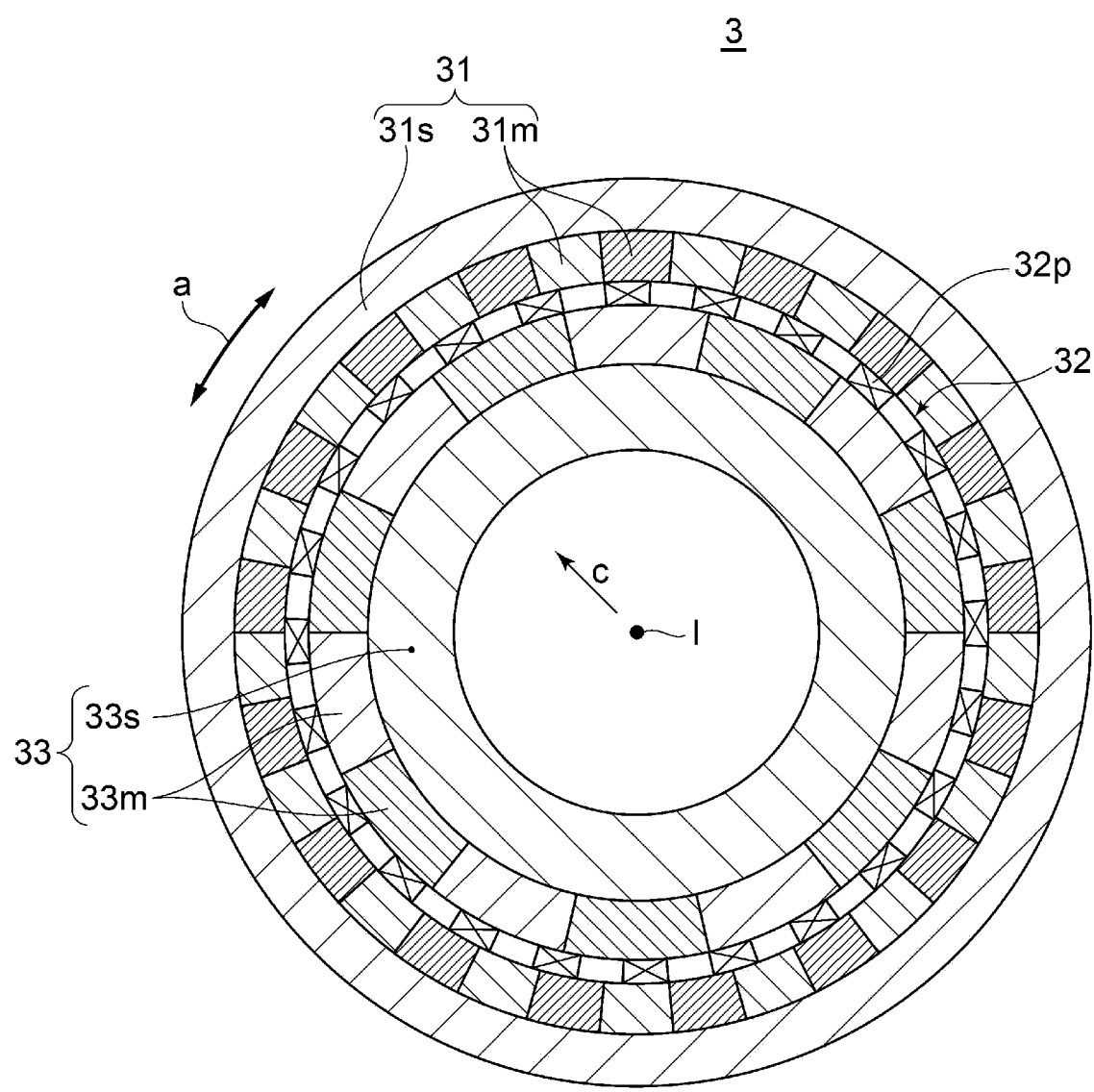
FIG. 2 is a view for describing a support mode of a magnetic geared motor in the electric-powered vehicle according to an embodiment of the present invention.
Figure 3:
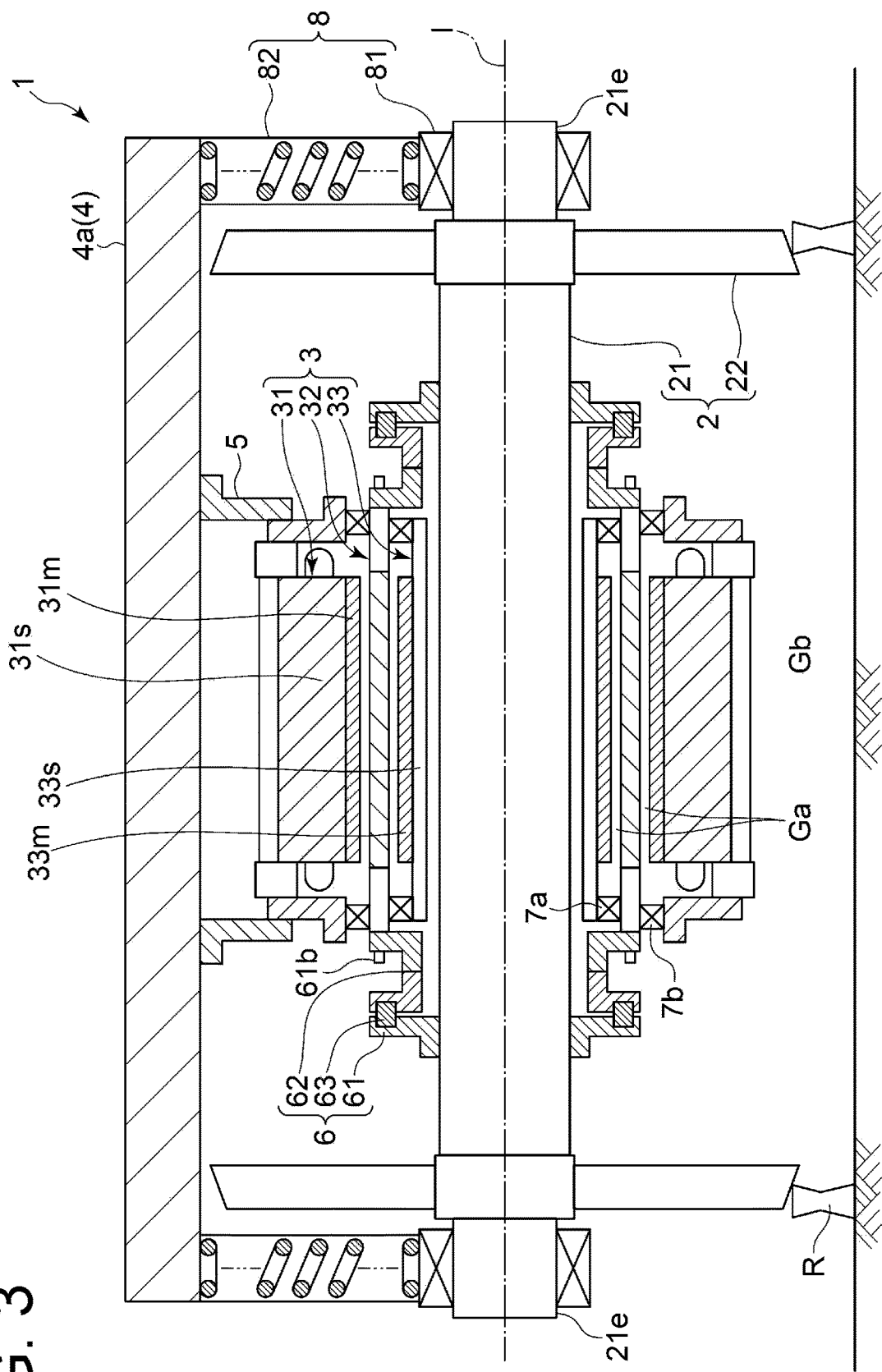
FIG. 3 is a view for describing a support mode of the magnetic geared motor in a railway vehicle (electric-powered vehicle) according to an embodiment of the present invention.

FIG. 1 is a schematic diagram showing a drive device for an electric-powered vehicle 1 according to an embodiment of the present invention. FIG. 2 is a schematic view of a cross section of a magnetic geared motor 3 along the radial direction according to an embodiment of the present invention. Further. FIG. 3 is a view for describing a support mode of the magnetic geared motor 3 in the electric-powered vehicle 1 according to an embodiment of the present invention.

The electric-powered vehicle 1 is a vehicle that can travel by an electric-powered motor (drive source), such as a railway vehicle, a vehicle of a new transportation system, or an electric car. As shown in FIG. 1, the electric-powered vehicle 1 includes an axle body 2 with an axle 21 extending in a vehicle width direction and drive wheels 22 connected to both ends of the axle 21, the magnetic geared motor 3 for rotating and the above-described axle 21, and an inverter connected to the magnetic geared motor 3. Then, the axle 21 is rotary driven as the magnetic geared motor 3 is rotary driven under the control of the inverter, whereby the electric-powered vehicle 1 is configured to travel. The electric-powered vehicle 1 may be configured to allow for regenerative braking by the magnetic geared motor, or may be configured to charge a battery 94 with electric power generated by the regenerative braking.

More specifically, the above-described magnetic geared motor 3 is configured by integrating a magnetic gear (flux-modulated type magnetic gear) and a motor, and including a, stator 31, a low-speed rotor 32, and a high-speed rotor 33. Describing in detail, as shown in FIG. 2, the above-described magnetic gear includes an outer diameter side magnet field (stator 31), an inner diameter side magnet field (high-speed rotor 33), and a magnetic pole piece device (low-speed rotor 32), each of which has a cylindrical (annular; the same applies hereinafter) shape as a whole. Then, when the magnetic pole piece device is disposed between the outer diameter side magnet field and the inner diameter side magnet field, the above-described magnetic gear has a structure where they are disposed at intervals (air gaps Ga) (see FIG. 3) of a constant distance from each other in a radial direction c (radial direction) on a same axis 1 (coaxial).

Further, as shown in FIG. 2, the outer diameter side magnet field and the inner diameter side magnet field described above, respectively, include magnetic pole pairs (31m, 33m), such as permanent magnets, which are composed of a plurality of N poles and S poles disposed at intervals (regular intervals) on the circumference in a cross section cut along the radial direction c of the magnetic geared motor 3. More specifically, the outer diameter side magnet field (stator 31) includes the plurality of magnetic pole pairs 31m and a stator core 31s which is also in charge of supporting the plurality of magnetic pole pairs 31m. Then, on the cylindrical inner circumferential surface of the outer diameter side magnet field, the plurality of magnetic pole pairs 31m are installed over the whole circumference in a state where the magnetic poles face the radial direction c and such that the N poles and the S poles are alternated along the circumferential direction. Likewise, the above-described inner diameter side magnet field (high-speed rotor 33) includes the plurality of magnetic pole pairs 33m and a support member 33s for supporting the plurality of magnetic pole pairs 33m. Then, on the cylindrical outer circumferential surface of the inner diameter side magnet field, the plurality of magnetic pole pairs 33m are installed over the whole circumference along a circumferential direction a, in the same manner as above. Further, the magnetic pole piece device (low-speed rotor 32) includes a plurality of magnetic pole pieces 32p (pole pieces) disposed at intervals (regular intervals) from each other over the whole circumference in the circumferential direction a.

Then, as shown in FIG. 2, a plurality of coils (not shown) are installed on the outer diameter side magnet field such that magnetic fluxes face the radial direction c and are each used as the stator 31 (stator), and the inner diameter side magnet field (high-speed rotor 33) is rotated by a magnetomotive force of the coils (not shown). Thus, the magnetic pole piece device (low-speed rotor 32) rotates according to the reduction ratio which is determined by the ratio of the number of pole pairs of the magnetic pole pairs 33m of the inner diameter side magnet field to the number of magnetic pole pieces 32p of the magnetic pole piece device.

In the embodiments shown in FIGS. 1 to 3, the electric-powered vehicle 1 is a railway vehicle. The magnetic geared motor 3 and an inverter 91 are connected by an electric power line. The inverter 91 is connected to an overhead line 93 (transmission line) via a transformer 92, and electric power is supplied to the inverter 91. Further, the inverter 91 is connected to the battery 94. Then, the electric power generated by regenerative braking is supplied to the battery 94, and the battery 94 can be charged. In the railway vehicle, the electric power generated by the regenerative braking is generally returned to a system side via the overhead line 93 for other railway vehicles, but the battery 94 may directly be charged depending on the condition of the system.

Next, a support mode of the magnetic geared motor 3 in the railway vehicle (electric-powered vehicle 1) having the above-described configuration will be described with reference to FIG. 3.

The electric-powered vehicle 1 shown in FIG. 3 is a railway vehicle. Such railway vehicle generally includes a bogie 4a (vehicle structure 4). The bogie 4a has a role of supporting a load of a vehicle body (not shown), and a vehicle body (not shown) internally forming a vehicle interior space is mounted on top of the bogie 4a.

Further, the bogie 4a is connected to the axle 21 by a connecting body 8, thereby assuming the role of absorbing a vibration of the railway vehicle generated by a railway condition, such as a joint of a rail R or traveling on a curve, and of stabilizing the vehicle body (not shown). More specifically, in the embodiment shown in FIG. 3, each of both ends of the axle 21 and the bogie 4a are connected by the connecting body 8. The connecting body 8 includes a bearing 81 for rotatably supporting both ends 21e of the axle 21, and an elastic member 82 (a coil spring in FIG. 3) disposed between the bearing 81 and the bogie 4a (vehicle structure 4). Then, the elastic member 82 absorbs an impact or vibration from the side of the rail R and stabilizes the vehicle body (not shown).

Hereinafter, the electric-powered vehicle 1 will be described by taking the above-described railway vehicle as an example.

As shown in FIG. 3, the electric-powered vehicle 1 includes the axle body 2 and the magnetic geared motor 3 already described, the vehicle structure 4 (the bogie 4a in FIG. 3) supported by the above-described axle body 2, a motor support 5 for connecting the magnetic geared motor 3 and the bogie 4a described above and supporting the magnetic geared motor 3 by the vehicle structure 4 (suspending and supporting downward in FIG. 3), and an elastic coupling 6 which is a member for transmitting a rotational force of the low-speed rotor 32 of the magnetic geared motor 3 described above to the axle 21.

In the case of the railway vehicle or the vehicle of the new transportation system, the above-described vehicle structure 4 may be the bogie 4a. In the case of the electric car, the above-described vehicle structure 4 may be, for example, a vehicle frame (chassis). Further, the vehicle structure 4 may be supported by the axle 21 via the bearing 81 as shown in FIG. 3, or may directly be supported by the drive wheels 22 (wheels) instead of the axle 21.

Further, all (61, 62, 63) of the above-described elastic coupling 6 may each be an elastic body formed of, for example, a rubber member. Alternatively, a part of the elastic coupling 6 may include the elastic body 63, and for example, portions mounted on the axle 21 and the low-speed rotor 32, respectively, may be connected via the elastic body 63, That is, as shown in FIG. 3, the elastic coupling 6 includes the axle mount portion 61 mounted on the axle 21, the motor mount portion 62 mounted on the magnetic geared motor 3 (low-speed rotor 32), and the elastic body 63 for connecting the axle mount portion 61 and the motor mount portion 62. The elastic body 63 may be a rubber member, or a spring member such as a leaf spring.

In the embodiment shown in FIG. 3, the axle mount portion 61 is fitted into the axle 21, and the motor mount portion 62 is mounted on the low-speed rotor 32 of the magnetic geared motor 3 by a bolt 61b. If the elastic body 63 is the spring member, one end of the spring member may be fastened to a flange (not shown) disposed at an axial end of the low-speed rotor 32, and another end of the spring member may be fastened to the axle mount portion 61 joined to the axle 21, by bolts (not shown) inserted into respective bolt holes.

Then, in the magnetic geared motor 3 of the electric-powered vehicle 1, the low-speed rotor 32 is coupled to the axle 21 by the elastic coupling 6, whereby the axle 21 rotates with the rotation of the low-speed rotor 32. Further, in the high-speed rotor 33, a part of the axle 21 extends with a gap Gb with respect to the inner circumferential surface of the high-speed rotor 33, whereby a part of the axle 21 extends non-contactly when the vehicle is stopped. That is, while the axle 21 is disposed in a penetrated state in the high-speed rotor 33 having the cylindrical shape, the high-speed rotor 33 is configured to run idle without contacting the axle 21 when the electric-powered vehicle 1 is traveling. By connecting the stator 31 to the motor support 5 in this state, most (all) of the load of the magnetic geared motor 3 is supported by the bogie 4a.

That is, in the embodiment shown in FIG. 3, the magnetic geared motor 3 is supported below the bogie 4a, and is rigidly suspended and supported by the bogie 4a with the motor support 5. Thus, the load of the magnetic geared motor 3 does not act directly on the axle 21 but acts indirectly via the bogie 4a. That is, the load of the magnetic geared motor 3 acts on the axle body 2 via the bogie 4a and the connecting body 8, and does not act directly on the axle 21 via the low-speed rotor 32.

With the above configuration, although the load when the electric-powered vehicle 1 is stationary (hereinafter, static load) naturally acts on the axle body 2, the load of the magnetic geared motor 3 associated with traveling of the electric-powered vehicle 1 (hereinafter, dynamic load) does not act directly on the axle body 2 but acts indirectly on the axle body 2 via the vehicle structure 4 and the connecting body 8. Thus, it is possible to absorb, by the connecting body 8, the dynamic load of the magnetic geared motor 3 acting on the axle body 2, and it is possible to reduce the dynamic load as compared with the case where the axle body 2 directly supports the magnetic geared motor 3. Therefore, for example, if the electric-powered vehicle 1 is the railway vehicle, it is possible to suppress wear of or damage to the rail R where the drive wheels 22 (wheels) are installed, and it is possible to extend the life of the rail R.

Further, if the axle 21 and the low-speed rotor 32 are rigidly coupled instead of the elastic coupling 6, the following inconveniences may occur. More specifically, in the case where the axle 21 and the low-speed rotor 32 are rigidly coupled, if the low-speed rotor 32 is rigidly supported with the side of the stator 31 by a bearing (outer diameter side bearing 7b described later) or the like as shown in FIG. 3, it is impossible to obtain the effect by the elastic member 82 of the connecting body 8 described above, and the static load and the dynamic load of the magnetic geared motor 3 are applied to the axle 21. At this time, if the rigidity of the connection portion between the low-speed rotor 32 and the axle 21 is low, the presence of the elastic member 82 of the connecting body 8 described above also causes inclination of the low-speed rotor 32 in the magnetic geared motor 3. Thus, by connecting the axle 21 and the low-speed rotor 32 with the elastic coupling 6, it is possible to suppress the above-described two movements.

Moreover, in the embodiment shown in FIG. 3, the electric-powered vehicle 1 further includes an inner diameter side bearing 7a and the outer diameter side bearing 7b, each of which is a rolling bearing. The inner diameter side bearing 7a includes a first outer ring fixed to the low-speed rotor 32, a first inner ring fixed to the high-speed rotor 33, and a first rolling element rotatably held between the first outer ring and the first inner ring. Further, the outer diameter side bearing 7b includes a second outer ring fixed to the stator 31 (frame portion), a second inner ring fixed to the low-speed rotor 32, and a second rolling element rotatably held between the second outer ring and the second inner ring.

That is, the outer diameter side bearing 7h connects the stator 31 and the low-speed rotor 32 to allow for a relative rotation thereof, supporting the low-speed rotor 32 by the stator 31. Further, the inner diameter side bearing 7a connects the low-speed rotor 32 to allow for a relative rotation thereof supporting the high-speed rotor 33 by the low-speed rotor 32. Thus, it is possible to support the magnetic geared motor 3 by the vehicle structure 4 more appropriately.

With the above configuration, in the electric-powered vehicle 1, the magnetic geared motor 3 is supported by the vehicle structure 4, for example, suspended and supported by the vehicle structure 4 (such as the bogie of the railway vehicle or the vehicle frame of the electric car), as well as the low-speed rotor 32 (output shaft) and the axle body 2 are coupled via the elastic coupling 6. As described above, by using the magnetic geared motor 3 as the drive source of the electric-powered vehicle 1 and supporting the magnetic geared motor 3 by the vehicle structure 4, it is possible to reduce the size and weight of the electric-powered vehicle 1 while reducing the dynamic load of the magnetic geared motor 3 acting during traveling of the electric-powered vehicle 1.

Further, since the low-speed rotor 32 of the magnetic geared motor 3 and the axle 21 of the axle body 2 are coupled via the elastic coupling 6, the axle 21 is rotated by the low-speed rotor 32. Thus, for example, even if the axle 21 is inclined with respect to the magnetic geared motor 3 depending on the traveling situation, it is possible to absorb such inclination by the elastic coupling 6 while appropriately transmitting power. Further, by suppressing that the low-speed rotor 32 is inclined with respect to the surrounding high-speed rotor 33 and the stator 31, it is also possible to protect the magnetic geared motor 3.

The present invention is not limited to the above-described embodiments, and also includes an embodiment obtained by modifying the above-described embodiments and an embodiment obtained by combining these embodiments as appropriate.

In the above-described embodiment, the magnetic geared motor 3 is suspended and supported by the vehicle structure 4. However, the present invention is not limited to the present embodiment, and the magnetic geared motor 3 may be supported by a method other than suspension, for example, by installation on top of the vehicle structure.

APPENDIX (1) An electric-powered vehicle (1) according to at least one embodiment of the present invention includes: an axle body (2) that includes an axle (21) and drive wheels (22) connected to both ends (21e) of the axle (21); a magnetic geared motor (3) for rotating the axle (21), the magnetic geared motor (3) including a stator (31), a low-speed rotor (32), and a high-speed rotor (33); a vehicle structure (4) supported by the axle body (2); a motor support (0.5) for connecting the vehicle structure (4) and the stator (31), and supporting the magnetic geared motor (3) by the vehicle structure (4); and an elastic coupling (6) for connecting the low-speed rotor (32) and the axle (21) such that a rotational force of the low-speed rotor (32) is transmittable to the axle (21).

With the above configuration (1), in the electric-powered vehicle (1) which is, for example, the railway vehicle, the vehicle of the new transportation system, or the electric car, the magnetic geared motor (3) is supported by the vehicle structure (4), for example, suspended and supported by the vehicle structure (4) (such as the bogie (4a) of the railway vehicle or the vehicle frame of the electric car), as well as the low-speed rotor (32) (output shaft) and the axle body (2) are connected via the elastic coupling (6). As described above, by using the magnetic geared motor (3) as the drive source of the electric-powered vehicle (1) and supporting the magnetic geared motor (3) by the vehicle structure (4), it is possible to reduce the size and weight of the electric-powered vehicle (1) while reducing the dynamic load of the magnetic geared motor (3) acting on the axle body (2) during traveling of the electric-powered vehicle (1).

Further, since the low-speed rotor (32) of the magnetic geared motor (3) and the axle (21) of the axle body (2) are connected via the elastic coupling (6), the axle (21) is rotated by the low-speed rotor (32). Thus, for example, even if the axle (21) is inclined with respect to the magnetic geared motor (3) depending on the traveling situation, it is possible to absorb such inclination by the elastic coupling (6) while appropriately transmitting power. Further, the magnetic geared motor (3) has a coaxial structure where the cylindrical low-speed rotor (32) is sandwiched between the stator (31) on the outer circumferential side and the high-speed rotor (33) on the inner circumferential side while the respective air gaps (Ga) are disposed. However, by suppressing that the low-speed rotor (32) is inclined with respect to the surrounding high-speed rotor (33) and the stator (31), it is also possible to protect the magnetic geared motor (3).

(2) In some embodiments, in the above configuration (1), the electric-powered vehicle (1) further includes a connecting body (8) for connecting each of the both ends (21e) of the axle (21) and the vehicle structure (4). The connecting body (8) includes: a bearing (81) for rotatably supporting the both ends (21e) of the axle (21); and an elastic member (82) disposed between the bearing (81) and the vehicle structure (4).

With the above configuration (2), the load of the magnetic geared motor (3) acts on the axle body (2) via the vehicle structure (4) and the connecting body (8). Thus, it is possible to absorb, by the connecting body (8), the dynamic load of the magnetic geared motor (3) acting on the axle body (2), and it is possible to reduce the dynamic load as compared with the case where the axle body (2) directly supports the magnetic geared motor (3). Therefore, for example, if the electric-powered vehicle (1) is the railway vehicle, it is possible to suppress wear of or damage to the rail (R) where the drive wheels (22) (wheels) are installed, and it is possible to extend the life of the rail (R).

(3) In some embodiments, in the above configurations (1) or (2), the low-speed rotor (3), the high-speed rotor (33), and the stator (31) each have a cylindrical shape, the low-speed rotor (32) is disposed between the high-speed rotor (33) and the stator (31) disposed on an outer circumferential side of the high-speed rotor (33), and a part of the axle (21) extends without contacting an inner circumferential surface of the high-speed rotor (33) in the high-speed rotor (33).

With the above configuration (3), while the axle (21) is disposed in a penetrated state in the high-speed rotor (33) having the cylindrical shape, a part of the axle (21) is configured to extend with the gap (Gb) with respect to the inner circumferential surface of the high-speed rotor (33). Thus, the more appropriate support is possible such that the load of the magnetic geared motor (3) acts via the vehicle structure (4) instead of directly acting on the axle body (2), and it is possible to reduce the dynamic load of the magnetic geared motor (3) acting on the axle body (2) during traveling of the electric-powered vehicle (1).

(4) In some embodiments, in the above configurations (1) to (3), the electric-powered vehicle (1) further includes: an inner diameter side bearing (7a) that includes a first outer ring fixed to the low-speed rotor (32), a first inner ring fixed to the high-speed rotor (33), and a first rolling element rotatably held between the first outer ring and the first inner ring; and an outer diameter side bearing (7b) that includes a second outer ring fixed to the stator (31), a second inner ring fixed to the low-speed rotor (32), and a second rolling element rotatably held between the second outer ring and the second inner ring.

With the above configuration (4), the high-speed rotor (33) and the low-speed rotor (32) are connected to the stator (31) via the two bearings (81). Thus, it is possible to support the magnetic geared motor (3) by the vehicle structure (4) more appropriately.

(5) In some embodiments, in the above configurations (1) to (4), the elastic coupling (6) includes: an axle mount portion (61) mounted on the axle (21); a motor mount portion (62) mounted on the low-speed rotor (32); and an elastic body (63) for connecting the axle mount portion (61) and the motor mount portion (62).

With the above configuration (5), the elastic coupling (6) can appropriately connect the axle (21) and the low-speed rotor (32) while appropriately transmitting the rotation of the low-speed rotor (32) to the axle (21).

(6) In some embodiments, in the above configuration (5), the elastic body (63) is a rubber member.

With the above configuration (6), it is possible to appropriately absorb, by the rubber member, the inclination of the axle (21) with respect to the magnetic geared motor (3).

(7) In some embodiments, in the above configuration (5), the elastic body (63) is a spring member.

With the above configuration (7), it is possible to appropriately absorb, by the spring member such as the leaf spring, the inclination of the axle (21) with respect to the magnetic geared motor (3).

(8) In some embodiments, in the above configurations (1) to (7), the electric-powered vehicle (1) is a railway vehicle, the vehicle structure (4) is a bogie (4a) of the railway vehicle, and the magnetic geared motor (3) is suspended and supported by the motor support (5).

With the above configuration (8), the electric-powered vehicle (1) is the railway vehicle whose drive source is the magnetic geared motor (3), and the magnetic geared motor (3) is suspended and supported by the bogie (4a) of the railway vehicle. Thus, the same effects as in the above configurations (1) to (7) are achieved.

REFERENCE SIGNS LIST

1 Electric-powered vehicle
2 Axle body
21 Axle
21e End
22 Drive wheel
3 Magnetic geared motor
31 Stator
31m Magnetic pole pair (stator)
31s Stator core (stator)
32 Low-speed rotor
32p Magnetic pole piece
33 High-speed rotor
33m Magnetic pole pair (high-speed rotor)
33s Support member (high-speed rotor)
4 Vehicle structure
4a Bogie
5 Motor support
6 Elastic coupling
61 Axle mount portion
61b Bolt
62 Motor mount portion
63 Elastic body
7a Inner diameter side bearing
7b Outer diameter side hearing
8 Connecting body
81 Bearing
82 Elastic member
91 Inverter
92 Transformer
93 Overhead line
94 Battery
Ga Air gap
Gb Gap (between axle and high-speed rotor)
a Circumferential direction
c Radial direction
l Axis
R Rail

The invention claimed is:

1. An electric-powered vehicle, comprising:
an axle body that includes an axle and drive wheels connected to both ends of the axle;
a magnetic geared motor for rotating the axle, the magnetic geared motor including a stator, a low-speed rotor, and a high-speed rotor;
a vehicle structure supported by the axle body;
a motor support for connecting the vehicle structure and the stator, and supporting the magnetic geared motor by the vehicle structure;
an elastic coupling for coupling the low-speed rotor and the axle such that a rotational force of the low-speed rotor is transmittable to the axle; and
a connecting body for connecting each of the both ends of the axle and the vehicle structure,
wherein the connecting body includes: a bearing for rotatably supporting the both ends of the axle; and an elastic member disposed between the bearing and the vehicle structure, and
wherein the elastic coupling is configured to absorb an inclination of the axle, which arises via the connecting body as the electric-powered vehicle travels.

2. The electric-powered vehicle according to claim 1, wherein the low-speed rotor, the high-speed rotor, and the stator each have a cylindrical shape,
wherein the low-speed rotor is disposed between the high-speed rotor and the stator disposed on an outer circumferential side of the high-speed rotor, and
wherein a part of the axle extends without contacting an inner circumferential surface of the high-speed rotor in the high-speed rotor, and
wherein the high-speed rotor is configured to run idle without contacting the axle during running of the electric-powered vehicle.

3. The electric-powered vehicle according to claim 1, further comprising:
an inner diameter side bearing that includes a first outer ring fixed to the low-speed rotor, a first inner ring fixed to the high-speed rotor, and a first rolling element rotatably held between the first outer ring and the first inner ring; and
an outer diameter side bearing that includes a second outer ring fixed to the stator, a second inner ring fixed to the low-speed rotor, and a second rolling element rotatably held between the second outer ring and the second inner ring.

4. The electric-powered vehicle according to claim 1, wherein the elastic coupling includes:
an axle mount portion mounted on the axle;

a motor mount portion mounted on the low-speed rotor; and an elastic body for connecting the axle mount portion and the motor mount portion.

5. The electric-powered vehicle according to claim 4, wherein the elastic body is a rubber member.

6. The electric-powered vehicle according to claim 4, wherein the elastic body is a spring member.

7. The electric-powered vehicle according to claim 1, wherein the electric-powered vehicle is a railway vehicle, wherein the vehicle structure is a bogie of the railway vehicle, and wherein the magnetic geared motor is suspended and supported by the motor support.

* * * * *